US 7,046,799 B2

(12) United States Patent
Ma

(10) Patent No.: US 7,046,799 B2
(45) Date of Patent: May 16, 2006

(54) COMMUNICATION HEADSET AND METHOD

(75) Inventor: Jeong J. Ma, Buffalo Grove, IL (US)

(73) Assignee: Motorola, Inc., Schaumburg, IL (US)

(*) Notice: Subject to any disclaimer, the term of this patent is extended or adjusted under 35 U.S.C. 154(b) by 48 days.

(21) Appl. No.: 10/661,755

(22) Filed: Sep. 12, 2003

(65) Prior Publication Data
US 2005/0058280 A1    Mar. 17, 2005

(51) Int. Cl.
H04M 1/00 (2006.01)
H04M 9/00 (2006.01)
H04B 1/38 (2006.01)

(52) U.S. Cl. .............. 379/433.13; 379/430; 455/575.2

(58) Field of Classification Search .......... 379/433.13, 379/430; 455/575.2; 381/381, 330
See application file for complete search history.

(56) References Cited

U.S. PATENT DOCUMENTS

| 3,549,831 | A | 12/1970 | Forney |
| 3,621,156 | A | 11/1971 | Kilewer |
| 3,916,312 | A | 10/1975 | Campbell |
| 4,039,765 | A | 8/1977 | Tichy et al. |
| 4,340,972 | A | 7/1982 | Heist |
| 4,484,029 | A | 11/1984 | Kenney |
| 4,845,772 | A | 7/1989 | Metroka et al. |
| 4,882,745 | A | 11/1989 | Silver |
| 6,421,426 | B1 | 7/2002 | Lucey |
| 2002/0021800 | A1 | 2/2002 | Bodley et al. |

Primary Examiner—Benny Quoc Tieu
(74) Attorney, Agent, or Firm—Design IP

(57) ABSTRACT

A communication headset (10) having an ear mount (12), a communication base unit (14), a hinge unit (16) that pivotally connects the communication base unit (14) to the ear mount (12) and allows the ear mount (12) to be rotated between an open position and a closed position relative to the communication base unit (14), an activation switch (18) that automatically activates the communication base unit (14) in the open position and automatically de-activates the communication base unit (14) in the closed position.

23 Claims, 5 Drawing Sheets

COMMUNICATION HEADSET AND METHOD

FIELD OF THE INVENTION

The present invention relates to a communication headset, and more particularly to a headset having an activation switch.

BACKGROUND OF THE INVENTION

Wireless, hands-free communication headsets are known in the art. Such headsets typically include a communication base unit, an adjustable ear loop to mount the base unit proximate the operator's ear, and microphone fixed to and extending from the base (often the microphone is attached to a boom). The terms "ear loop," "ear mount," and "ear hook" as used in the specification and claims are intended to be synonymous and are intended to describe a portion of the headset that is hooked over the operator's ear. The headset is donned by pivoting the ear loop to an extended position and then wrapping the ear loop around the operator's ear.

After the headset is donned, the operator must perform the additional step of activating the headset by depressing an on/off button, which is often externally located on either the front or side surface of the base unit. In a similar manner, the operator must depress the on/off button after the headset is removed in order to deactivate the headset. Because such headsets are often used while the operator is walking or performing another activity, the step of depressing the on/off button can be forgotten or difficult.

In order to provide a more comfortable fit, such headsets are preferably very small and lightweight. Thus, providing a button large enough for the operator to depress consumes valuable external space on the headset housing and adversely affect the appearance of the headset.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
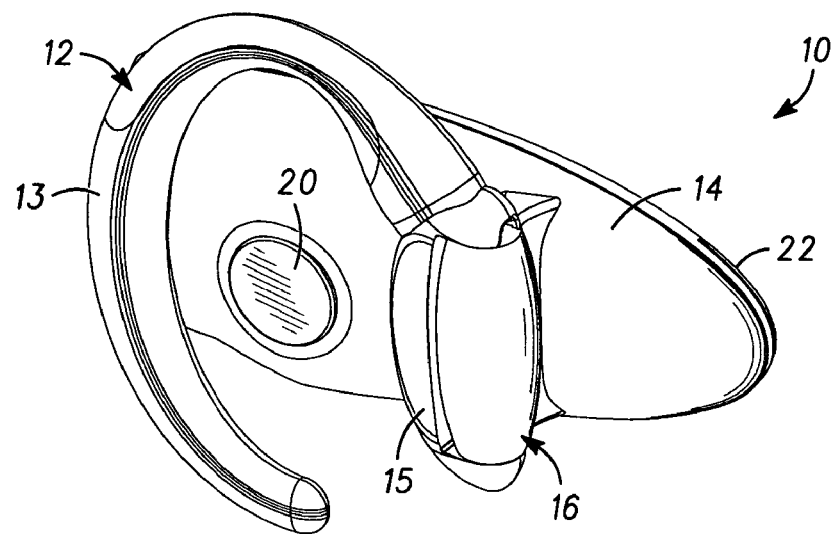
FIG. 1 is a perspective view of a communication device showing the ear mount arranged in the closed position.

The headset is described below with reference to the accompanying drawings wherein like elements are used throughout to designate like elements. In addition, reference numerals that are introduced in the specification in association with a particular drawing figure may be repeated in other figures without additional description in the specification in order to provide context for other features.

A wireless telephone headset in accordance with one embodiment is shown in FIGS. 1–6 and is designated generally by reference numeral 10. The headset generally comprises an ear mount 12, a wireless communication base unit 14, a hinge unit 16, and an activation switch 18. Although the communication device of the present invention is illustrated and described herein as being a wireless telephone headset, it should be appreciated by one of ordinary skill in the art that the communication device could comprise other types of communication devices, such as a wired telephone headset or other hands-free communication device, without departing from the scope of the present invention.

The embodiment of the communication base unit 14 shown in FIG. 1 includes an earphone (or speaker) 20 and microphone 22. A short range wireless transceiver inside the base unit housing provides wireless communication to and from the headset. The transceiver may be implemented using any suitable transceiver, such those using radio frequency (RF) or light emissions, and may for example use a Bluetooth compatible transceiver, an infrared light transceiver, or the like. Any suitable commercially available earphone 20 and microphone 22 can be used.

The ear mount 12 supports the communication device 10 on the ear of an operator. The ear mount 12 has a hook portion 13 at one end and a hinge portion 15 at the other end. The hook portion 13 has a shape that compliments the external contour of the human ear. The thickness of the hook portion 13 is selected so that the hook portion can be elastically deformed and easily wrapped around the operator's ear.

Figure 2:
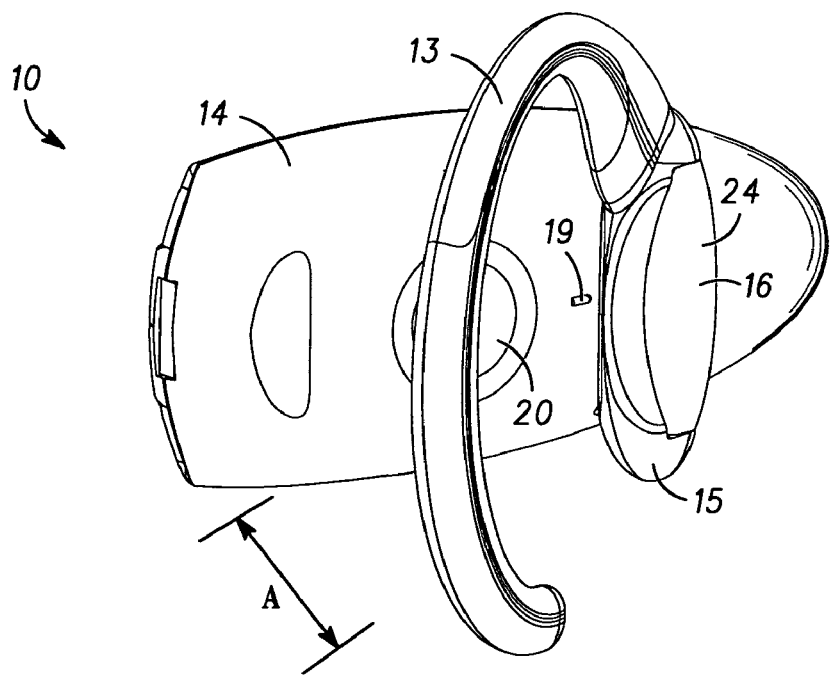
FIG. 2 is a perspective view of the communication device of FIG. 1 showing the ear mount arranged in the open position.
Figure 3:
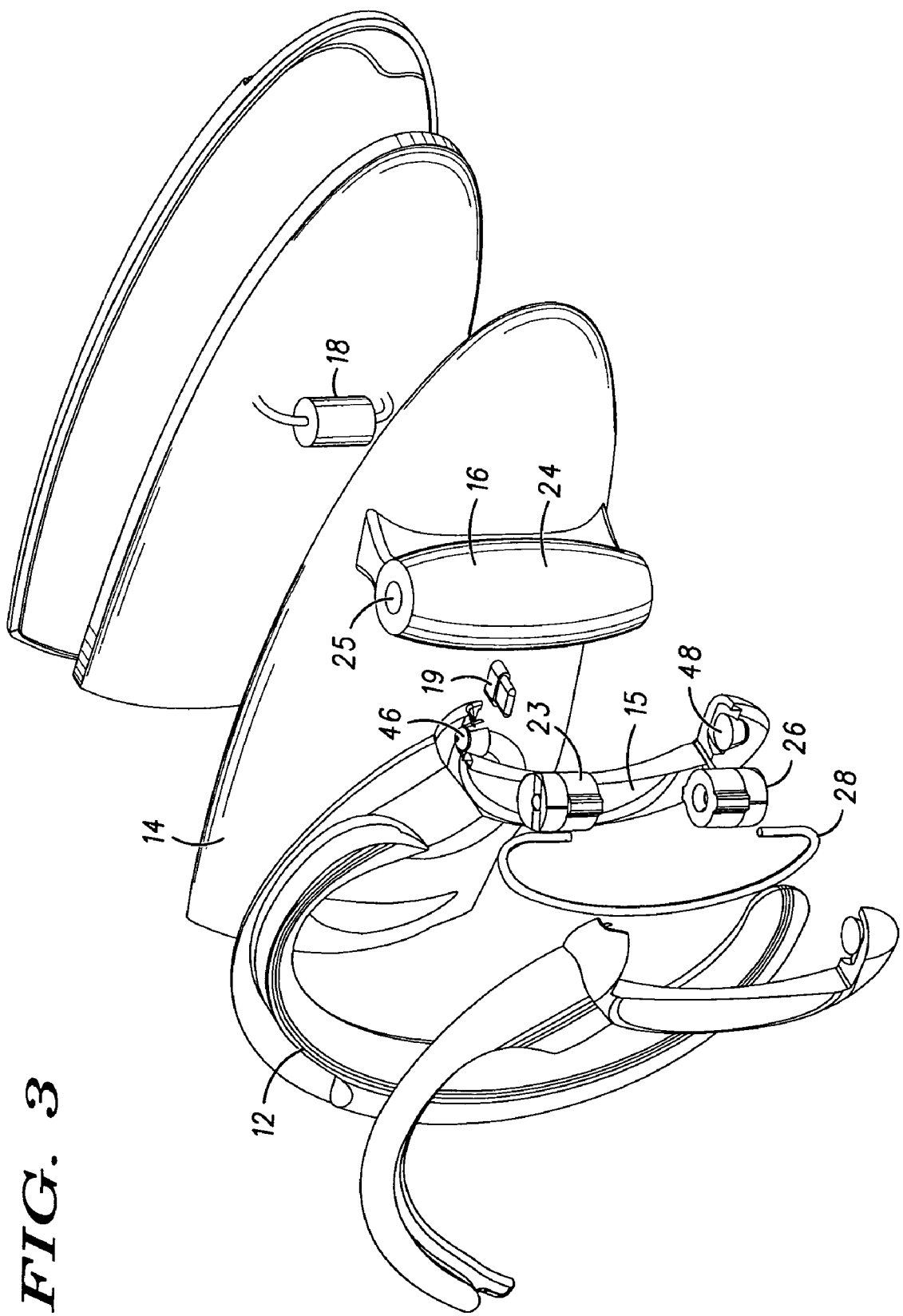
FIG. 3 is an exploded, perspective view of the communication device of FIG. 1.

Referring to FIG. 3, the hinge unit 16 includes the hinge portion 15 of the ear mount 12, a hinge unit housing 24 fixed to the communication base unit 14, and a C-shaped hinge spring 28. The hinge unit 16 pivotally connects the ear mount 12 to the communication base unit 14. The ear mount 12 pivotally rotates between a closed position, as best seen in FIG. 1, and an open position, as best seen in FIG. 2. Referring to FIG. 3, the ear mount 12 may advantageously be manufactured from an organic polymer, and may for example be constructed from two interconnecting components.

Figure 4:
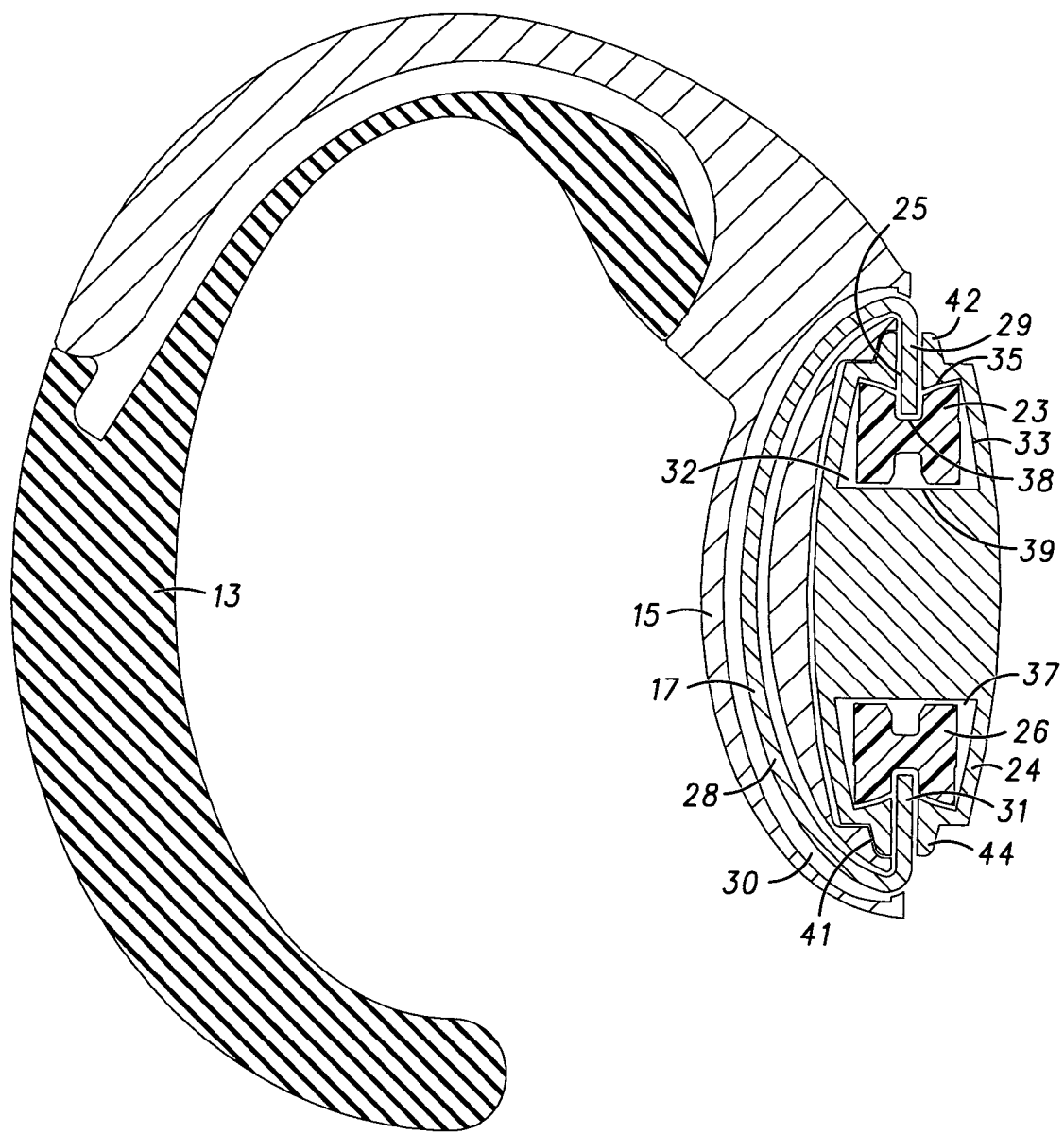
FIG. 4 is fragmentary cross-sectional view of the ear mount and hinge unit housing of the communication device of FIG. 1.

The hinge spring 28 is C-shaped and has opposed, linear end portions 29, 31 and a curved intermediate portion 17. Referring to FIG. 4, the intermediate portion 17 of the hinge spring 28 is seated in a recess 30 in the hinge portion 15 of the ear mount 12. The recess 30 has a shape that compliments the curved shape of the intermediate portion 17 of the hinge spring 28. Each of the end portions 29, 31 of the spring 28 extend into a respective aperture 25, 41 in the reduced-diameter, conical protrusions 42, 44 formed on each axial end of the hinge unit housing 24. The conical protrusions 42, 44 rotatably sit in conical sockets 46, 48 (see FIG. 3) in the hinge portion 15 of the ear mount 12.

The hinge spring 28 is formed from any suitable material, such as a metal, that is durable and will resist failure and/or fatigue from repeated flexing. Of course, any other suitable material could also be used. As used in the specification the term "spring" simply means that the member is able to flex, thereby allowing the plungers 23, 26 to move inwardly and outwardly relative to the hinge unit 16 when the ear mount 12 is rotated.

A detent mechanism can be employed inside the hinge unit housing 24. The detent mechanism is designed to releasably hold the ear mount 12 in the open position. In the embodiment illustrated in FIGS. 1–6, the detent mechanism comprises a pair of irregularly-shaped plungers 23, 26 connected to the end portions 29, 31 of the hinge spring 28. However, it should be appreciated by those of ordinary skill in the art that many other detent mechanisms could be provided without departing from the scope of the present invention.

The detent mechanism is designed to releasably hold the ear mount 12 in a position when the ear mount 12 is at a predetermined angle A. The predetermined angle A represents the angle just beyond the angle at which the ear mount 12 transitions from the closed position to the open position. This angle A must be large enough to minimize accidental movement of the ear mount 12 into the open position, but small enough that the ear mount 12 does not move into the closed position when being used by the operator. Taking these factors into account, an angle A of about 30 degrees has been found to be advantageous, although angles from 20–40 degrees would be acceptable.

Figure 5:
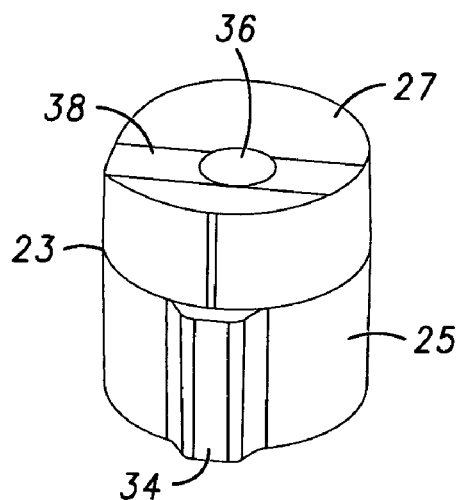
FIGS. 5 and 6 are enlarged, perspective views of the plungers shown in FIG. 3.
Figure 6:
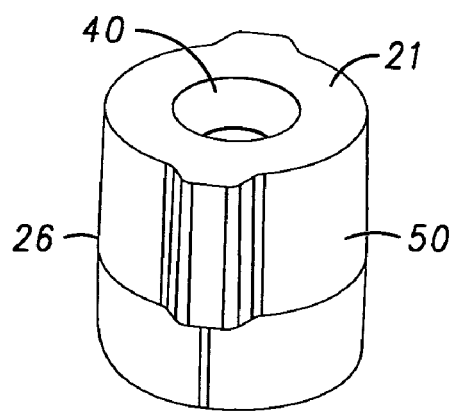

Referring to FIGS. 5–6, the plungers 23, 26 comprise generally-cylindrical, elastomeric segments. The plungers 23, 26 are identical in this embodiment. In the interest of simplicity, the features of each of the plungers 23, 26 are labeled only on the plunger 23 or plunger 26 in which they are visible. It should be understood that each of the features appear on both plungers 23, 26. The plungers 23, 26 each have a generally-cylindrical, radial outer surface 50, a first axial end surface 27, and a second axial end surface 21. The first end surface 27 has a central bore 36 and a slit 38 extending across the diameter of the first end surface 27. The surface on each side of the slit 38 is tapered outwardly, thereby forming a V-shaped contour when viewed from an angle looking through the length of the slit 38 as shown in FIG. 4. The second end surface 21 is generally flat with a central bore 40. Optionally, diametrically-opposed, radially-protuding tabs 34 can be formed on the radial outer surface 50, which limit rotation of the plungers 23, 26 in the hinge unit 16 outside a predetermined range of rotation.

Referring to FIG. 4, the plungers 23, 26 are seated in opposed bores 32, 37 in the hinge unit 24. The bores 32, 37 are identical in this embodiment. In order to avoid cluttering the drawing figure, the features of each of the bores 32, 37 are labeled only on the upper bore 32 or the lower bore 37. It should be understood that each of the features appear on both bores 32, 37. Each of the bores 32, 37 has a generally-cylindrical radial outer surface 33, a V-shaped first end surface 35 that contacts the first end surface 27 (see FIG. 5) of the plungers 23, 26, and a generally-flat second end surface 39 that contacts the second end surface 21 (see FIG. 6) of the plungers 23, 26. The end portions 29, 31 of the spring 28 are fixed in the central bore 36 (see FIG. 5) of the first end surface 27 of the plungers 23, 26 so that rotation of the spring 28 causes the plungers 23, 26 to rotate within the hinge unit 24.

The first end surface 27 of the plungers 23, 26 and the first end surface 35 of the bore 32 have complimenting male and female V-shaped contours that closely align with one another when the ear mount 12 is moved to the open position shown in FIGS. 2 and 4. In the open position, the plungers 23, 26 releasably hold the ear mount 12 at an extended position from the communication unit 12. The detent mechanism prevents the ear mount 12 from inadvertently moving from the open position to the closed position when the headset 10 is donned by the operator and provides the operator with confirmation of when the ear mount 12 reaches the open position.

As the ear mount 12 is rotated to the closed position, the plungers 23, 26 rotate within the housing 24 out of alignment with the first end surface 35 of the bore 32, thereby axially compressing the plungers 23, 26. Axial compression causes the plungers 23, 26 to exert a rotational bias in the hinge unit towards the open position. Friction preferably allows the detent mechanism to position and releasably hold the ear mount in the closed position.

Figure 7:
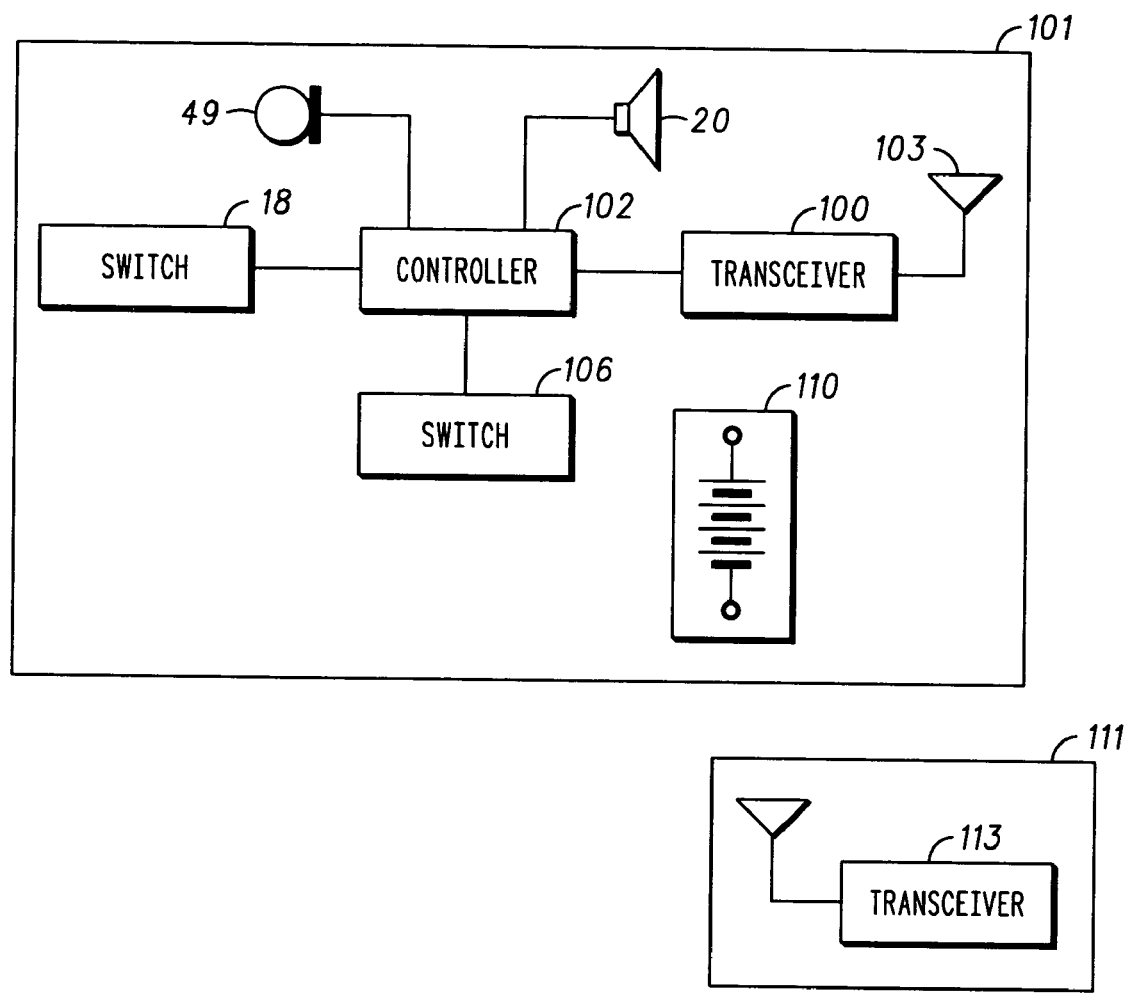
FIG. 7 is a circuit schematic in block diagram illustrating the headset circuit.

The base unit 14 includes base circuit 101 which is shown schematically in FIG. 7. The base circuit 101 includes a transceiver 100, a controller 102, the activation switch 18, the microphone 22 and the earpiece (or speaker) 20. The transceiver 100 is coupled to an antenna 103, which may be a radio wave antenna, a microwave antenna, a combination of a light sensitive device and a light emitter, or other suitable wireless transmission medium interface. The controller 102 may be implemented using discrete logic, a programmable logic unit, a microprocessor, a digital signal processor, a combination thereof, or the like. The activation switch 18 may be implemented using a magnetic read switch, a plunger switch, an optical switch, or any other suitable switch. The base unit 14 can advantageously include a volume control switch 106, or other optional user interfaces such as a display, rotary dial, or the like. In operation, the controller 102 is responsive to the activation switch 18 to deactivate the base circuit 101 in a closed position of the ear mount 12 and activate the base circuit 101 in the open position of the ear mount 12.

The illustrated base circuit 101 communicates with a primary communication device 111 via transceivers 100 and 113. The primary communication device 111 may a cordless or other landline telephone, a cellular or other mobile communication device, a two-way radio, dispatch device, portable, vehicle or home electronics, or the like. The primary communication device transceiver 113 includes other circuitry, not shown, that facilitate longer range communications.

The communication headset 10 includes a sensor that automatically activates the communication base unit in the open position and automatically deactivates the communication base unit 14 in the closed position. In this context, the terms "activate" and "deactivate" customarily mean to turn power on and off, respectively, to the headset 10. However, these terms could also mean to activate or deactivate the microphone 22 and/or the earphone 20, or to activate or deactivate a "power save" mode. It is envisioned that by turning off the transceiver, for example by disconnecting the battery 110 from the transceiver 100 when the activation switch 18 indicates the ear mount 12 is closed, significant power savings can be achieved. However, it may be advantageous to enter a power save mode wherein the transceiver 100 would reduce functionality, and periodically wake up to determine if the communication link with the primary communication device transceiver 113 is active. This sleep mode can be initiated automatically by moving the ear mount 12 to the closed position, and the sleep mode may terminate by fully powering up the base circuit 101 upon moving the ear mount 12 to the open position. In the embodiment illustrated in FIG. 3, the activation switch 18 includes a detect pin 19 that projects outwardly from the communication base unit 14 toward the ear mount 12. The activation switch 18 automatically activates and deactivates the communication base unit 14 in response to pivotal movement of the ear mount 12. When the ear mount 12 is rotated to the closed position, the ear mount 12 contacts the detect pin 19 of the switch 18, which then deactivates the base unit 14. When the ear mount 12 is rotated to the open position, the ear mount 12 moves out of contact with the detect pin 19 of the switch 18, which then activates the base unit 14. As explained above, the transition angle A between the closed position and the open position is 30 degrees in this embodiment. The activation switch 18 eliminates the need for the operator to depress a separate activation button on the communication base unit 14 as required on prior art communication headsets.

While the principles of the invention have been described above in connection with specific embodiments, it is to be clearly understood that this description is made only by way of example and not as a limitation of the scope of the invention. For example, the sensor may comprise other proximity or contact switches known to those of ordinary skill in the art. Additionally, although the headset is disclosed including a transceiver for communicating with a proximate primary communication device, it will be recognized that the headset could be unidirectional (transmit or receive), and/or for communications with a distant source.

The invention claimed is:

1. A communication headset, comprising:
   an ear mount;
   a communication base unit;
   a hinge unit that pivotally connects the communication base unit to the ear mount and allows the ear mount to be rotated between an open position and a closed position relative to the communication base unit; and
   a sensor that activates the communication base unit when the ear mount is rotated into the open position and deactivates the communication base unit when the ear mount is rotated into the closed position.

2. The communication headset recited in claim 1, wherein the sensor comprises a switch that is mounted inside the communication base and a detect pin that projects outwardly from the communication base unit toward the ear mount.

3. The communication headset recited in claim 2, wherein the ear mount contacts the detect pin in the closed position, and the ear mount moves out of contact with the detect pin in the open position.

4. The communication headset recited in claim 1, wherein the hinge unit includes a detent mechanism for positioning and releasably holding the ear mount in the open position.

5. The communication headset recited in claim 4, wherein the detent mechanism releasably holds the ear mount in the open position when the ear mount has been rotated between at least 20 and no more than 40 degrees away from the communication base unit.

6. The communication headset recited in claim 4, wherein the detent mechanism releasably holds the ear mount in the open position when the ear mount has been rotated 30 degrees away from the communication base unit.

7. The communication headset recited in claim 4, wherein the detent mechanism comprises an elastomeric plunger inside the hinge unit.

8. The communication headset recited in claim 7, wherein said hinge unit includes a hinge spring fixed to the ear mount, a hinge unit housing fixed to the communication base unit, a socket in the hinge unit housing, and an elastomeric plunger fixed the hinge spring and positioned within the socket.

9. The communication headset recited in claim 3, wherein the ear mount rotates about 30 degrees between the open and closed position.

10. The communication headset recited in claim 1, wherein the communication base unit includes an earphone and a microphone.

11. A communication headset, comprising:
    an ear mount;
    a base housing;
    a circuit carried on the base housing and including at least one of a transmitter and a receiver;
    a hinge unit that pivotally connects the base housing and the ear mount and allows the ear mount to be rotated between an open position and a closed position relative to the base housing; and
    a switch carried in the base housing, the switch responsive to the open and closed positions of the ear mount, the switch automatically controlling the activation and deactivation of the circuit, the circuit automatically responsive to the ear mount being in the open position to power on the circuit and in the closed position to at least temporarily power down the circuit.

12. The communication headset of claim 11, where the switch includes a detect pin that projects outwardly from the housing toward the ear mount, and wherein the ear mount contacts the detect pin in the closed position, and the ear mount releases the detect pin in the open position.

13. The communication headset recited in claim 12, wherein the hinge unit includes a detent mechanism for positioning and releasably holding the ear mount in the open position and closed position, wherein the detent comprises a first plunger located in a first bore of the hinge unit.

14. The communication headset recited in claim 13, wherein the first plunger and first bore include complimentary V-shaped contours.

15. The communication headset recited in claim 14, wherein the first plunger includes a female V-shaped contour and the first bore includes a male V-shaped contour.

16. The communication headset recited in claim 15, wherein the detent further comprises a second plunger located in a second bore of the hinge unit.

17. The communication headset recited in claim 11, wherein the hinge unit includes a hinge spring fixed to the ear mount, a hinge unit housing fixed to the communication base unit, a hinge spring socket in the hinge unit housing, and an elastomeric plunger connected to the hinge spring and positioned within the socket.

18. The communication headset recited in claim 17, wherein the ear mount rotates about 30 degrees between the open and closed position.

19. The communication headset recited in claim 11, wherein the communication base unit includes an earphone and a microphone.

20. A communication headset, comprising:
    an ear mount;
    a communication base unit having an earphone and a microphone;
    a hinge unit that pivotally connects the communication base unit to the ear mount and allows the ear mount to be rotated between an open position and a closed position relative to the communication base unit, the hinge unit including a hinge spring fixed to the ear mount, a hinge unit housing fixed to the communication base unit, a hinge spring socket in the hinge unit housing, and an elastomeric plunger fixed the hinge spring and positioned within the socket;
    a detent mechanism for positioning and releasably holding the ear mount in the open position and closed position, the detent mechanism comprising first and second opposing plungers located inside the hinge unit, the first and second opposing plungers each including a V-shaped contour that is complimentary in shape to a respective V-shaped contour located on the hinge unit; and, a switch that activates the communication base unit in the open position and deactivates the communication unit in the closed position, the switch being mounted inside the communication base unit and including a detect pin that projects outwardly from the communication base unit toward the ear mount;

wherein the ear mount contacts the detect pin in the closed position, and the ear mount moves out of contact with the detect pin in the open position.

21. A method of operating a headset, the headset including an ear mount for supporting the headset on a user's ear, the ear mount movingly carried on a base, the base carrying a circuit for short range communication with a primary communication device and a switch for controlling the state of the circuit, the method comprising the steps of:

turning the circuit off in response to the ear mount moving to a closed position wherein the ear mount is positioned against the base; and turning the circuit on when the ear mount moves to an open position with a portion of the ear mount spaced from the base.

22. The method of claim 21, wherein turning the circuit off comprises moving the ear mount out of contact with a detect pin.

23. The method of claim 22, wherein turning the circuit on comprises moving the ear mount into contact with a detect pin.

* * * * *